(12) United States Patent
Van Meter, II

(10) Patent No.: US 9,807,577 B2
(45) Date of Patent: Oct. 31, 2017

(54) SYSTEM FOR LIMITING MOBILE PHONE DISTRACTION IN MOTOR VEHICLES AND / OR WITHIN FIXED LOCATIONS

(71) Applicant: Stanley G. Van Meter, II, Lake Mary, FL (US)

(72) Inventor: Stanley G. Van Meter, II, Lake Mary, FL (US)

(73) Assignee: United Efficiency, Inc., Mount Dora, FL (US)

( * ) Notice: Subject to any disclaimer, the term of this patent is extended or adjusted under 35 U.S.C. 154(b) by 0 days.

(21) Appl. No.: 14/813,092

(22) Filed: Jul. 29, 2015

(65) Prior Publication Data

US 2016/0036957 A1    Feb. 4, 2016

Related U.S. Application Data

(60) Provisional application No. 62/030,104, filed on Jul. 29, 2014.

(51) Int. Cl.
| | |
|---|---|
| *H04B 1/06* | (2006.01) |
| *H04W 4/14* | (2009.01) |
| *H04M 1/64* | (2006.01) |
| *H04M 1/725* | (2006.01) |

(52) U.S. Cl.
CPC ......... *H04W 4/14* (2013.01); *H04M 1/72577* (2013.01); *H04M 1/64* (2013.01); *H04M 1/72552* (2013.01); *H04M 2250/10* (2013.01); *H04M 2250/12* (2013.01)

(58) Field of Classification Search
CPC ......... H04M 1/72572; H04M 2250/52; H04M 3/16; H04M 3/42382; H04B 17/10; H04B 17/391; H04B 1/18; H04B 5/0037; H04B 1/3877; H04B 7/26; G11B 31/006; G11B 19/02; G11B 27/02; G11B 27/34
USPC .................................. 455/404.2, 569.2, 573
See application file for complete search history.

(56) References Cited

U.S. PATENT DOCUMENTS

| | | | | |
|---|---|---|---|---|
| 2011/0063098 A1* | 3/2011 | Fischer | .............. | G07C 9/00119 340/439 |
| 2012/0028680 A1* | 2/2012 | Breed | .................... | B60C 11/24 455/556.1 |

* cited by examiner

*Primary Examiner* — Tu X Nguyen
(74) *Attorney, Agent, or Firm* — White-Welker & Welker, LLC; Matthew T. Welker, Esq.

(57) ABSTRACT

A system that utilizes a remote device that is capable of transmitting speed, velocity, instantaneous velocity, angular velocity, acceleration, deceleration or other means of data to wirelessly notify a mobile handset that the vehicle is in motion or is traveling at a speed, velocity, instantaneous velocity, angular velocity, acceleration, deceleration greater than zero without using the cellular signal, gps data, or on board diagnostic computer or other direct or indirect link to vehicle mechanical, electrical mechanical or computer derived speed data. This system, or an embodiment thereof shall be universally compatible with all vehicles including passenger vehicles, commercial vehicles, busses, trains, airplanes, boats, construction equipment or otherwise where it is desirable to limit distractions from a personal communication device.

11 Claims, 1 Drawing Sheet

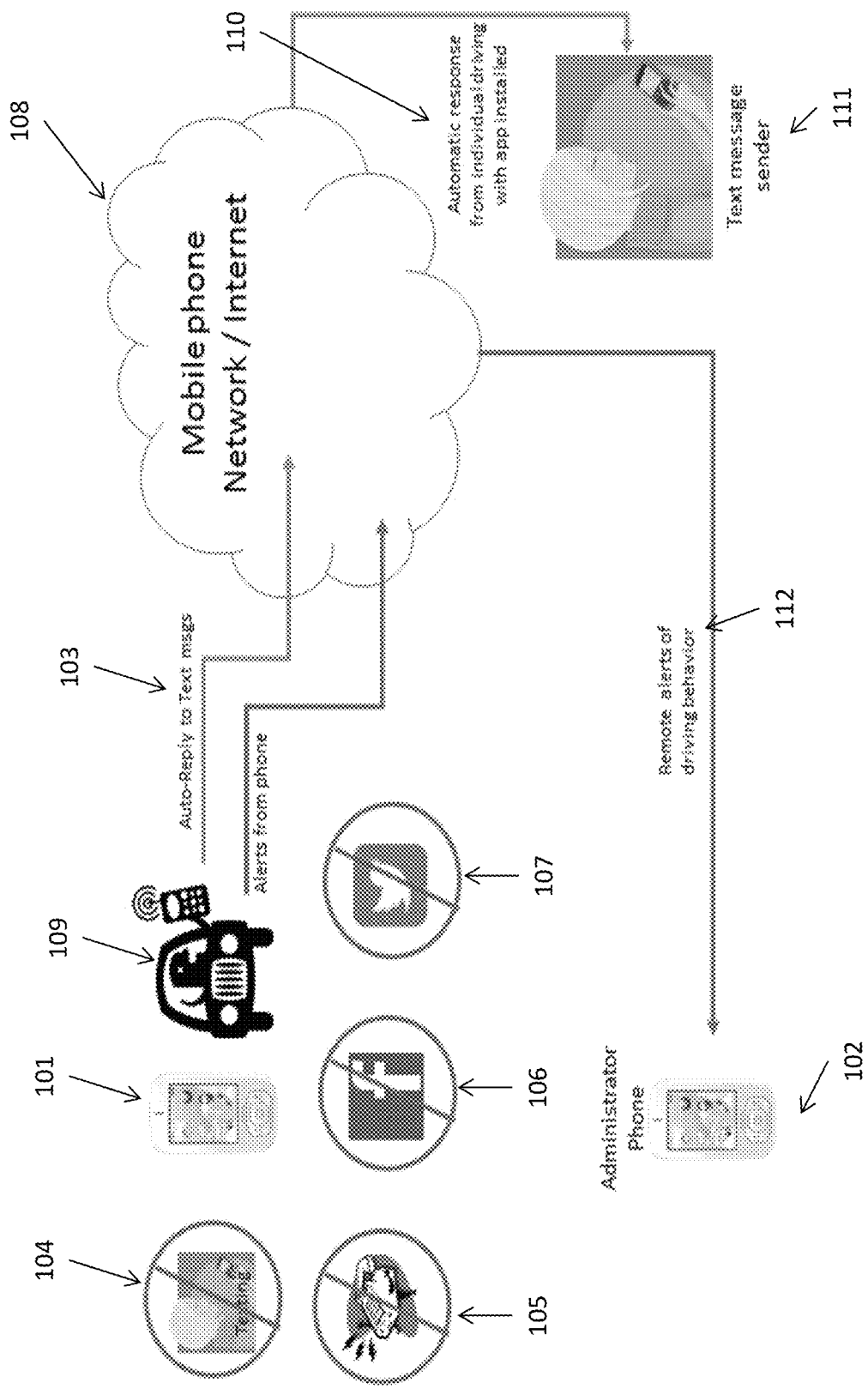

SYSTEM FOR LIMITING MOBILE PHONE DISTRACTION IN MOTOR VEHICLES AND / OR WITHIN FIXED LOCATIONS

CROSS REFERENCE TO RELATED APPLICATIONS

This application claims priority from U.S. Provisional Patent Application Ser. No. 62/030,104, entitled "System for Limiting Mobile Phone Distraction in Motor Vehicles and/or within fixed locations", filed on 29 Jul. 2014. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to motor vehicle control. More specifically, the present invention relates to a means to disable and/or limit mobile communication device functionality based on motor vehicle threshold velocity information obtained from a remote data source and transmitted wirelessly to a mobile devices located within the motor vehicle for the purposes of limiting distracted driving.

BACKGROUND OF THE INVENTION

Existing Mobile Phones and devices can be used while driving for a variety of activities—phone conversations, text messaging, email, social media, Internet browsing, etc. Performing these activities while driving detracts the driver from vehicle operation and often times is the cause of motor-vehicle accidents. Recent studies have compared text messaging while driving to driving under the influence of alcohol or drugs. Disabling certain functions while operating a motor vehicle would remove temptation from driver and could potentially decrease motor vehicle accidents. Further, operating mobile phones in certain locations is inappropriate.

For example many high school and middle school age children are given mobile phones by their parents; however, operating the mobile device while in class is not appropriate and schools are facing new, difficult challenges from student's text messaging other students instead of focusing on school work and educator instructions.

Definitions

Unless stated to the contrary, for the purposes of the present disclosure, the following terms shall have the following definitions:

Administrators, commonly known as admins or sysops (system operators), are software or system users who have been granted the technical ability to perform certain special actions.

The Global Positioning System (GPS) is a space-based navigation system that provides location and time information in all weather conditions, anywhere on or near the earth where there is an unobstructed line of sight to four or more GPS satellites. The system provides critical capabilities to military, civil, and commercial users around the world. The United States government created the system, maintains it, and makes it freely accessible to anyone with a GPS receiver.

A printed circuit board (PCB) mechanically supports and electrically connects electronic components using conductive tracks, pads and other features etched from copper sheets laminated onto a non-conductive substrate. PCBs can be single sided (one copper layer), double sided (two copper layers) or multi-layer (outer and inner layers). Multi-layer PCBs allow for much higher component density. Conductors on different layers are connected with plated-through holes called vias. Advanced PCBs may contain components—capacitors, resistors or active devices—embedded in the substrate. Printed circuit boards are used in all but the simplest electronic products. Alternatives to PCBs include wire wrap and point-to-point construction. PCBs require the additional design effort to lay out the circuit, but manufacturing and assembly can be automated. Manufacturing circuits with PCBs is cheaper and faster than with other wiring methods as components are mounted and wired with one single part. Furthermore, operator wiring errors are eliminated.

Radio frequency (RF) is a rate of oscillation in the range of around 3 kHz to 300 GHz, which corresponds to the frequency of radio waves, and the alternating currents which carry radio signals. RF usually refers to electrical rather than mechanical oscillations. However, mechanical RF systems do exist (see mechanical filter and RF MEMS). Although radio frequency is a rate of oscillation, the term "radio frequency" or its abbreviation "RF" are also used as a synonym for radio—i.e., to describe the use of wireless communication, as opposed to communication via electric wires.

In electronics and telecommunications a transmitter or radio transmitter is an electronic device which, with the aid of an antenna, produces radio waves. The transmitter itself generates a radio frequency alternating current, which is applied to the antenna. When excited by this alternating current, the antenna radiates radio waves. In addition to their use in broadcasting, transmitters are necessary component parts of many electronic devices that communicate by radio, such as cell phones, wireless computer networks, Bluetooth enabled devices, garage door openers, two-way radios in aircraft, ships, spacecraft, radar sets and navigational beacons. The term transmitter is usually limited to equipment that generates radio waves for communication purposes; or radiolocation, such as radar and navigational transmitters. Generators of radio waves for heating or industrial purposes, such as microwave ovens or diathermy equipment, are not usually called transmitters even though they often have similar circuits. The term is popularly used more specifically to refer to a broadcast transmitter, a transmitter used in broadcasting, as in FM radio transmitter or television transmitter. This usage typically includes both the transmitter proper, the antenna, and often the building it is housed in. An unrelated use of the term is in industrial process control, where a "transmitter" is a telemetry device which converts measurements from a sensor into a signal, and sends it, usually via wires, to be received by some display or control device located a distance away.

In radio communications, a radio receiver is an electronic device that receives radio waves and converts the information carried by them to a usable form. It is used with an antenna. The antenna intercepts radio waves (electromagnetic waves) and converts them to tiny alternating currents which are applied to the receiver, and the receiver extracts the desired information. The receiver uses electronic filters to separate the desired radio frequency signal from all the other signals picked up by the antenna, an electronic amplifier to increase the power of the signal for further processing, and finally recovers the desired information through demodulation. The information produced by the receiver may be in the form of sound (an audio signal), images (a video signal) or data (a digital signal). A radio receiver may be a separate piece of electronic equipment, or an electronic circuit within another device. Devices that contain radio receivers include television sets, radar equipment, two-way radios, cell phones, wireless computer networks, GPS navigation devices, satellite dishes, radio telescopes, bluetooth enabled devices, garage door openers, and baby monitors. In consumer electronics, the terms radio and radio receiver are often used specifically for receivers designed to reproduce the audio (sound) signals transmitted by radio broadcasting stations, historically the first mass-market commercial radio application.

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

A client is a piece of computer hardware or software that accesses a service made available by a server. The server is often (but not always) on another computer system, in which case the client accesses the service by way of a network. The term applies to programs or devices that are part of a client-server model.

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

A gateway is a link between two computer programs or systems such as Internet Forums. A gateway acts as a portal between two programs allowing them to share information by communicating between protocols on a computer or between dissimilar computers.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

iOS (originally iPhone OS) is a mobile operating system created and developed by Apple Inc. and distributed exclusively for Apple hardware. It is the operating system that presently powers many of the company's mobile devices, including the iPhone, iPad, and iPod touch.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.

An operating system (OS) is software that manages computer hardware and software resources and provides common services for computer programs. The operating system is an essential component of the system software in a computer system. Application programs usually require an operating system to function.

Push Notification, Push, or server push, describes a style of Internet-based communication where the request for a given transaction is initiated by the publisher or central server. It is contrasted with pull/get, where the request for the transmission of information is initiated by the receiver or client.

A server is a running instance of an application (software) capable of accepting requests from the client and giving responses accordingly. Servers can run on any computer including dedicated computers, which individually are also often referred to as "the server".

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client—server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

SUMMARY OF THE INVENTION

The purpose of the present invention is to create a system that utilizes a remote device that is capable of transmitting speed, velocity, instantaneous velocity, angular velocity, acceleration, deceleration or other means of data to wirelessly notify a mobile handset that the vehicle is in motion or is traveling at a speed, velocity, instantaneous velocity, angular velocity, acceleration, deceleration greater than zero without using the cellular signal, gps data, or on board diagnostic computer or other direct or indirect link to vehicle mechanical, electrical mechanical or computer derived speed data. This system, or an embodiment thereof shall be universally compatible with all vehicles including passenger vehicles, commercial vehicles, busses, trains, airplanes, boats, construction equipment or otherwise where it is desirable to limit distractions from a personal communication device.

Further it is recognized that there are certain geographic locations where it is desirable to limit distractions from a personal communication device. Accordingly, this invention or an embodiment thereof will provide these capabilities.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIG. 1 is a flow chart showing how Smart Phones with the software application installed will silence alerts and automatically respond on behalf of the driver, when the driver is moving. Should the individual try to bypass or turn-off the automatic features an administrator (or Parental person) will be notified of the driver's behavior.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention is practiced. These embodiments are described in sufficient detail to enable those skilled in the art to practice the invention, but other embodiments is utilized and logical, mechanical, electrical, and other changes is made without departing from the scope of the present invention. The following detailed description is, therefore, not to be taken in a limiting sense, and the scope of the present invention is defined only by the appended claims.

It is widely recognized that GPS receivers, deployed in mobile phones are effective in obtaining position data in approximately 80% of driving circumstances. Because of these limitations an alternate means of deriving the mobile handset's velocity must be used to increase the effectiveness of other known methods. More particularly, geo-location technologies that rely exclusively on wireless networks such as time of arrival, time difference of arrival, angle of arrival, timing advance, and multipath fingerprinting, as is known to those skilled in the art, offer a shorter time-to-first-fix (TTFF) than GPS is used to provide threshold speed decision data. These methods also offer quick deployment and continuous tracking capability for navigation applications, without the added complexity and cost of upgrading or replacing any existing GPS receivers. However, acquisition lag times and lack of standardization on commercially available handsets limits effectiveness of the other known methods.

In summary, even when all of these things are considered, positioning data from either a satellite network or a cellular tower infrastructure network cannot be relied upon to provide consistent high quality speed data. Therefore, a more reliable method of providing speed or velocity data to the handset must be developed which do not exist currently.

Further, it is recognized that there are other means of detecting or measuring vehicle speed, velocity, acceleration or movement that can be derived from the motor vehicle's on-board diagnostic port. Because accessing this information requires a direct interface with the vehicle's computer and that link can be easily severed by removing the interface, it is an unreliable means of obtaining data that could be used to determine if the mobile phone should be placed into a limited service use.

A vehicle transmitter (VT) consists of a printed circuit board (PCB) with the capability through a sensor, or a variety of sensors of singular or multiple technologies to detect or predict driver and/or passenger entry or occupancy and initiate a sequence to wake itself. The vehicle transmitter has the capability through a sensor, or a variety of sensors of singular or multiple technologies including optical flow to detect or predict speed, velocity, instantaneous velocity, angular velocity, acceleration, deceleration or other data that can be used to determine if a vehicle is in motion.

The vehicle transmitter has the capability through a transmitter, or a variety of transmitters to broadcast the vehicle's speed, velocity, instantaneous velocity, angular velocity, acceleration, deceleration or other data that can be used to determine if a vehicle is in motion. As required, the vehicle transmitter is powered by a battery, of either a conventional or atomic battery, or, when used in connection with a tire of the vehicle, a capacitor, super capacitor or ultra-capacitor (super cap) and charged by, for example, rotation of the tire or movement of one or more masses, or powered by the vibrations from the motor vehicle, or solar power, or vehicle power. Thus, when the vehicle is moving, the circuit is in an active mode and a capacitor in the circuit is charged. On the other hand, when the vehicle is stopped, the circuit is in a passive mode and the capacitor is discharged.

Also, the vehicle transmitter can be arranged on other movable structures, other than a vehicle tire, whereby the movement of the structure causes charging of the capacitor and when the structure is not moving, the capacitor discharges and provides energy. Other movable structures include other parts of a vehicle including trailers and containers, boats, airplanes etc., a person, animal, wind or wave-operated device, tree or any structure, living or not, that can move and thereby permit a properly designed energy generator to generate electrical energy. Naturally other sources of environmental energy can be used consistent with the invention such as wind, solar, tidal, thermal, acoustic etc.

The vehicle transmitter is to be applied, attached or connected to the vehicle independently of the vehicles own electrical, control, computer or communication system. The application or attachment can be with adhesive, tape, or other mechanical fasteners as appropriate for a temporary, permanent or near-permanent installation. The embodiment of the vehicle transmitter shall be such that is it tamper resistant and tamper evident. The embodiment of the vehicle transmitter shall be such that in the event a sensor that detects or predicts speed, velocity, instantaneous velocity, angular velocity, acceleration, deceleration, motion, other data that can be used to determine if a vehicle is in motion is obscured, tampered with, or damaged, the vehicle transmitter transmits a signal as if the vehicle is in motion along with a trouble signal.

It is contemplated that many different embodiments or arrangements will exist to accommodate a large variety of vehicle types (too many to enumerate) and that the vehicle transmitter's is arranged or positioned in singular or multiple locations as necessary to achieve the desired outcome of limiting operator and/or passenger distractions.

It is contemplated that the embodiment of the vehicle transmitter will transmit a unique identification so that a mobile handset 101 can recognize the vehicle transmitter. It is also contemplated that the vehicle transmitter is fitted with a GPS chipset. It is also contemplated that the vehicle transmitter is fitted with a SIM card so that it may transmit collected data over a cellular network.

The land transmitter (LT) consists of a printed circuit board that is assigned a unique ID that defines single or multiple locations in which mobile phone use is desired to be limited by the mobile phone's owner. Examples include school, church, malls, offices, worksites, train stations, etc. Each land transmitter is a node singularly or a group of land transmitter's could form a web within a large structure each with their own unique ID or with a common ID. Each land transmitter is fitted with a means of transmitting an RF signal to mobile phones using commonly commercially available RF technology to signal the Phone that it is in range of a land transmitter or a group of land transmitter's. Administrators 102 of the system are contemplated to assign certain geo-tags to each land transmitter for purposes of establishing unique tags. Should the individual try to bypass or turn-off the automatic features an administrator (or Parental person) will be notified of the driver's behavior 112.

It is contemplated that the embodiment of the land transmitter will transmit a unique identification so that the mobile handset can recognize the land transmitter. It is also contemplated that the land transmitter is fitted with a GPS chipset. It is also contemplated that the land transmitter is fitted with a SIM card so that it may transmit collected data over a cellular network.

A mobile receiver (MR) is connected to the mobile device as part of the original equipment integrated into the mobile device's circuit board, or installed in the mobile device 101 after manufacture. Possible embodiments of the mobile receiver could include but are not limited to a SIM card, SD card, Mini SD card, Micro SD card, or other peripheral that is capable of directly interfacing with the mobile handset and receiving RF from the vehicle transmitter.

The mobile receiver receives RF signals from the vehicle transmitter or the land transmitter for processing or acknowledgement by the mobile handset 101. The mobile receiver will handoff the data provided by the vehicle transmitter or land transmitter along with the vehicle transmitter or land transmitter signature to the handset for processing or analysis. Based on the information provided (digital, analog, binary or otherwise) the mobile handset's profile is updated in accordance with mobile handset's administrative settings or the mobile handset will perform a scripted routine.

Contemplated settings or routines include, mobile device's feature set would be reduced when a vehicle 109 is in motion, feature set would be limited or "de-featured" in certain locations, device will send an automated response 103 with arriving or departing a land transmitter or vehicle transmitter signal area, the mobile handset 101 automatically responds 103 with a SMS, MMS, email, IM or a phone call 104 when it is contacted within the vehicle transmitter or land transmitter signal area using a mobile phone network or the Internet 108. Many permutations of embodiments are contemplated to achieve the desired feature set when interaction occurs between the vehicle transmitter, land transmitter and mobile receiver 101 and are incorporated herein.

It is contemplated that the embodiment of the mobile receiver 101, when it is added to the mobile handset after manufacture, shall be such that if it is removed from the handset, the handset shall only function in a limited fashion and that the handset transmit a trouble message.

A primary function of the invention, but not exclusive, is limiting text messaging 104 while driving. The mobile phone reports its position and speed to the remote server via cellular connection on a mobile phone network or the Internet 108. When the phone reports the location as moving on a public road, the text messaging function 104 is disabled, or limited to receive certain "urgent" phone calls or messages only. Similarly, limits could be placed on all mobile device functions, e.g., phone calls 105, email, social communications 106 and 107, Internet browsing, etc. from certain locations such as schools. Should the mobile device's internal processor allow, the device itself will limit operation based on predefined settings that are defined by the device's owner.

It is further contemplated that the invention will utilize methods for comprehensive limits to mobile devices such that they are used in a safe manner both while driving or operating equipment or in areas where mobile use is dangerous.

Contemplated features include: 1) Automatic response notification to caller 111 that phone user is driving 110, 2) Automatic response notification to caller 111 that phone user is in an area where phone use is not allowed, 3) a method of analyzing mobile handset derived data to determine vector of handset and in turn selectively limit handset feature set, 4) a method for establishing an internet interface for remotely limiting a mobile device's feature set based on location, speed, or proximity, 4) a method of remotely alerting an administrator if mobile handset software has been removed or modified, 5) a method for allowing the motor vehicle passenger to gain access to the full or partial device feature set by entering a code or solving a puzzle.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A system for limiting mobile phone distraction in motor vehicles and within fixed locations, executed by a machine, comprising:
   a vehicle transmitter;
      the vehicle transmitter consists of a printed circuit board (PCB) with the capability through a sensor, or a variety of sensors of singular or multiple technologies to detect or predict driver and/or passenger entry or occupancy and initiate a sequence to wake itself;
      the vehicle transmitter has the capability through a transmitter, or a variety of transmitters to broadcast the vehicle's speed, velocity, instantaneous velocity, angular velocity, acceleration, deceleration or other data that can be used to determine if a vehicle is in motion;
   a land transmitter;
      the land transmitter consists of a printed circuit board that is assigned a unique ID that defines single or multiple locations in which mobile phone use is desired to be limited by the mobile phone's owner; and
   a mobile receiver;
      the mobile receiver is connected to a mobile device as part of the original equipment integrated into the mobile device's circuit board, or installed in the mobile device after manufacture for receiving transmitted signals from the vehicle transmitter or land transmitter;
      the mobile device itself will limit operation based on predefined settings that are defined by the device's owner;

the vehicle transmitter programmatically sends commands to the mobile device to de-feature certain capabilities within the mobile application;

each land transmitter transmits a unique identification so that the mobile handset can recognize the land transmitter;

the mobile phone recognizes which vehicle transmitter it is nearby;

when driving, the mobile phone is detected by the vehicle transmitters;

the mobile phone reports to the administrator to determine what vehicle the driver is driving;

the vehicle transmitter is labeled to match the vehicle identification; and the vehicle identification transmits this to the mobile phone as its identification.

2. The system of claim 1, wherein the vehicle transmitter has the capability through a sensor, or a variety of sensors to detect or predict speed, velocity, instantaneous velocity, angular velocity, acceleration, deceleration or other data that can be used to determine if a vehicle is in motion.

3. The system of claim 2, wherein the sensors are of singular or multiple technologies including optical flow.

4. The system of claim 1, wherein the vehicle transmitter is powered by a moveable structure of the motor vehicle whereby the movement of the structure causes charging of the capacitor and when the structure is not moving, the capacitor discharges and provides energy.

5. The system of claim 4, wherein the vehicle transmitter is powered by a battery, of either a conventional or atomic battery, or, when used in connection with a tire of the vehicle, a capacitor, super capacitor or ultra-capacitor (super cap) and charged by the rotation of the tire.

6. The system of claim 1, wherein the vehicle transmitter is arranged or positioned in singular or multiple locations as necessary to achieve the desired outcome of limiting operator and/or passenger distractions.

7. The system of claim 1, wherein the vehicle transmitter transmits a unique identification so that the mobile handset can recognize the vehicle transmitter.

8. The system of claim 1, wherein the vehicle transmitter is fitted with a GPS chipset or a SIM card to transmit collected data over a cellular network.

9. The system of claim 1, wherein each land transmitter is fitted with a means of transmitting an RF signal to mobile phones to signal the phone that it is in range of a land transmitter or a group of land transmitter's; and assigning geo-tags to each land transmitter for purposes of establishing unique tags.

10. The system of claim 1, wherein each land transmitter is fitted with a GPS chipset or a SIM card so that it may transmit collected data over a cellular network.

11. The system of claim 1, wherein the mobile receiver includes a SIM card, SD card, Mini SD card, Micro SD card, or other peripheral that is capable of directly interfacing with the mobile handset and receiving RF from the vehicle transmitter.

\* \* \* \* \*